United States Patent
Iwadate (10) Patent No.: US 10,853,707 B2
(45) Date of Patent: Dec. 1, 2020

(54) IMAGE FORMING APPARATUS, CONTROL METHOD FOR IMAGE FORMING APPARATUS, AND STORAGE MEDIUM

(71) Applicant: CANON KABUSHIKI KAISHA, Tokyo (JP)

(72) Inventor: Masahiro Iwadate, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/252,417

(22) Filed: Jan. 18, 2019

(65) Prior Publication Data

US 2019/0156163 A1  May 23, 2019

Related U.S. Application Data

(63) Continuation of application No. 14/301,222, filed on Jun. 10, 2014, now Pat. No. 10,223,623.

(30) Foreign Application Priority Data

Jun. 13, 2013  (JP) ................. 2013-124599

(51) Int. Cl.
*G06K 15/02* (2006.01)
*G06K 15/00* (2006.01)

(52) U.S. Cl.
CPC ......... *G06K 15/027* (2013.01); *G06K 15/002* (2013.01); *G06K 15/40* (2013.01); *G06K 15/408* (2013.01)

(58) Field of Classification Search
CPC .... G06K 15/027; G06K 15/408; G06K 15/00; G06K 15/40; G06K 15/002

USPC ........................................................ 358/1.14
See application file for complete search history.

(56) References Cited

U.S. PATENT DOCUMENTS

| 2008/0158613 | A1* | 7/2008 | Suzuki | G03G 15/50 358/3.28 |
| 2009/0122351 | A1* | 5/2009 | Tsuchitoi | G03G 21/04 358/3.28 |
| 2009/0284767 | A1* | 11/2009 | Harada | G06F 3/1208 358/1.9 |

* cited by examiner

*Primary Examiner* — Tammy Paige Goddard
*Assistant Examiner* — Darryl V Dottin
(74) *Attorney, Agent, or Firm* — Canon U.S.A., Inc. IP Division (57) ABSTRACT

An image forming apparatus makes printing performed for maintenance by a service engineer charge-free, and prevents a print method for the service engineer from being used by a user. The image forming apparatus includes an input unit configured to input an image, a print unit configured to print the image input by the input unit, and a control unit configured to control the image input by the input unit to be output to the print unit and update a charging counter when the image forming apparatus operates in a first operation mode, and configured to control a specific pattern image to be superimposed on the image input by the input unit and the image with the superimposed specific pattern image to be output to the print unit without updating the charging counter when the image forming apparatus operates in a second operation mode.

12 Claims, 8 Drawing Sheets

IMAGE FORMING APPARATUS, CONTROL METHOD FOR IMAGE FORMING APPARATUS, AND STORAGE MEDIUM

CROSS-REFERENCE TO RELATED APPLICATIONS

This application is a continuation, and claims the benefit, of U.S. patent application Ser. No. 14/301,222, presently pending and filed on Jun. 10, 2014, and claims the benefit of, and priority to, Japanese Patent Application No. 2013-124599 filed Jun. 13, 2013, which applications are hereby incorporated by reference herein in their entireties.

BACKGROUND OF THE INVENTION

Field of the Invention

The present invention relates to an image forming apparatus, and more particularly to a charge-managing image forming apparatus having a mode in which a user uses the apparatus and a mode in which a service engineer uses the apparatus.

Description of the Related Art

Among image forming apparatuses having copy functions and print functions, there is an image forming apparatus including a charging counter for counting the number of printed sheets to be charged. Such an image forming apparatus has been conventionally known to charge a user based on the number of printed sheets counted by the charging counter.

Japanese Patent Application Laid-Open No. 8-152826 discusses an image forming apparatus including such a charging counter. This image forming apparatus can accurately calculate the number of sheets printed based on an instruction from a user by subtracting the number of sheets printed during maintenance performed by a service engineer from the number of all the printed sheets.

The image forming apparatus discussed in Japanese Patent Application Laid-Open No. 8-152826 does not distinguish between a product printed by the service engineer and a product printed by the user. That is, the image forming apparatus does not distinguish between the printed product not to be charged and the printed product to be charged.

In such a apparatus, in a case where the print method for the service engineer is leaked to the user, there is a possibility that the image forming apparatus may be used improperly. For example, the user pretends to be a service engineer, and performs printing by using the image forming apparatus without a charge. In such a case, the image forming apparatus cannot properly charge the user for the printing.

SUMMARY OF THE INVENTION

According to an aspect of the present invention, an image forming apparatus includes an input unit, a print unit, and a control unit. The input unit is configured to input an image. The print unit is configured to print the image input by the input unit. The control unit is configured to control the image input by the input unit to be output to the print unit and update a charging counter when the image forming apparatus operates in a first operation mode, and configured to control a specific pattern image to be superimposed on the image input by the input unit and the image with the superimposed specific pattern image to be output to the print unit without updating the charging counter when the image forming apparatus operates in a second operation mode.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<System Configuration>

Figure 1:
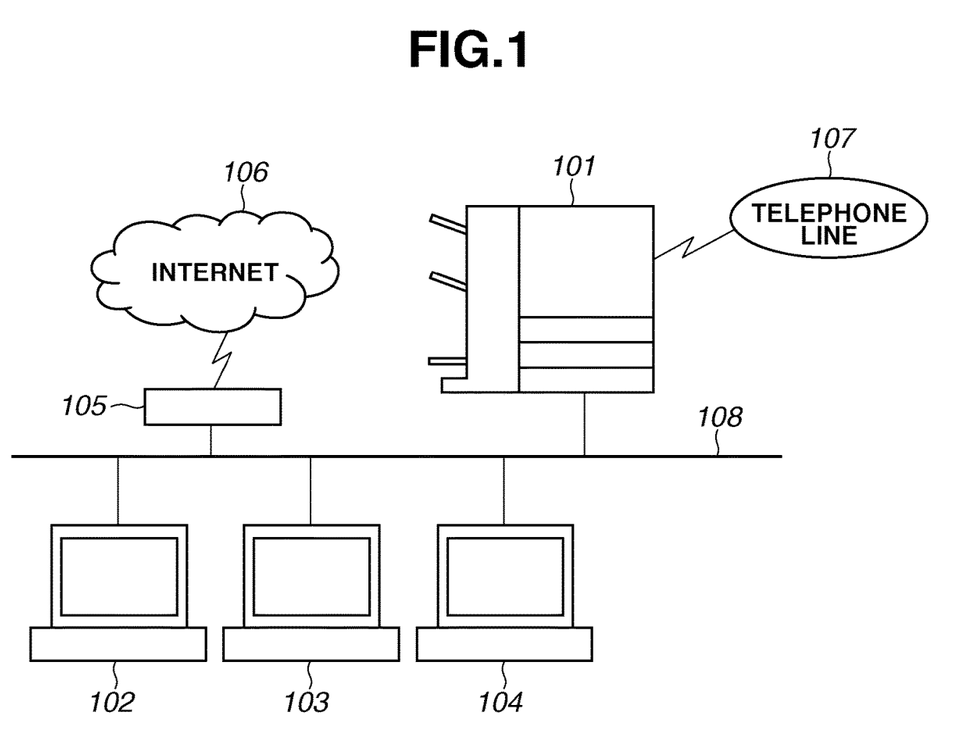
FIG. 1 is a diagram illustrating one example of an image forming system.

FIG. 1 is a diagram illustrating one example of an image forming system of the present exemplary embodiment. In FIG. 1, a multifunction peripheral 101 has a copy function, a print function, a scanning function, and a facsimile function. Each of personal computers (PCs) 102, 103, and 104 can transmit print data to the multifunction peripheral 101 through a printer driver installed therein. Upon receipt of the print data from the PCs 102 through 104, the multifunction peripheral 101 prints an image on a sheet based on the received print data, and outputs a printed product to a discharge tray. Moreover, the multifunction peripheral 101 is connected to a telephone line 107 to receive facsimile data. The multifunction peripheral 101 prints an image generated based on the received facsimile data, and outputs a printed product to the discharge tray.

The multifunction peripheral 101, the PCs 102 through 104, a router 105 are connected to a network 108, and the multifunction peripheral 101 and the PCs 102 through 104 are connected to an Internet 106 through the router 105. In the system illustrated in FIG. 1, the multifunction peripheral 101 receives print data from the PCs 102, 103, and 104, the Internet 106, and the telephone line 107 at various timing, and performs print processing.

In the present exemplary embodiment, the multifunction peripheral 101 is described as one example of an image forming apparatus. Other examples of the image forming apparatus include an apparatus only having a function of printing image data input from a scanner, an apparatus only having a function of printing print data received from the PCs 102 through 104, and an apparatus only having a function of printing facsimile data received through the telephone line 107.

Figure 2:
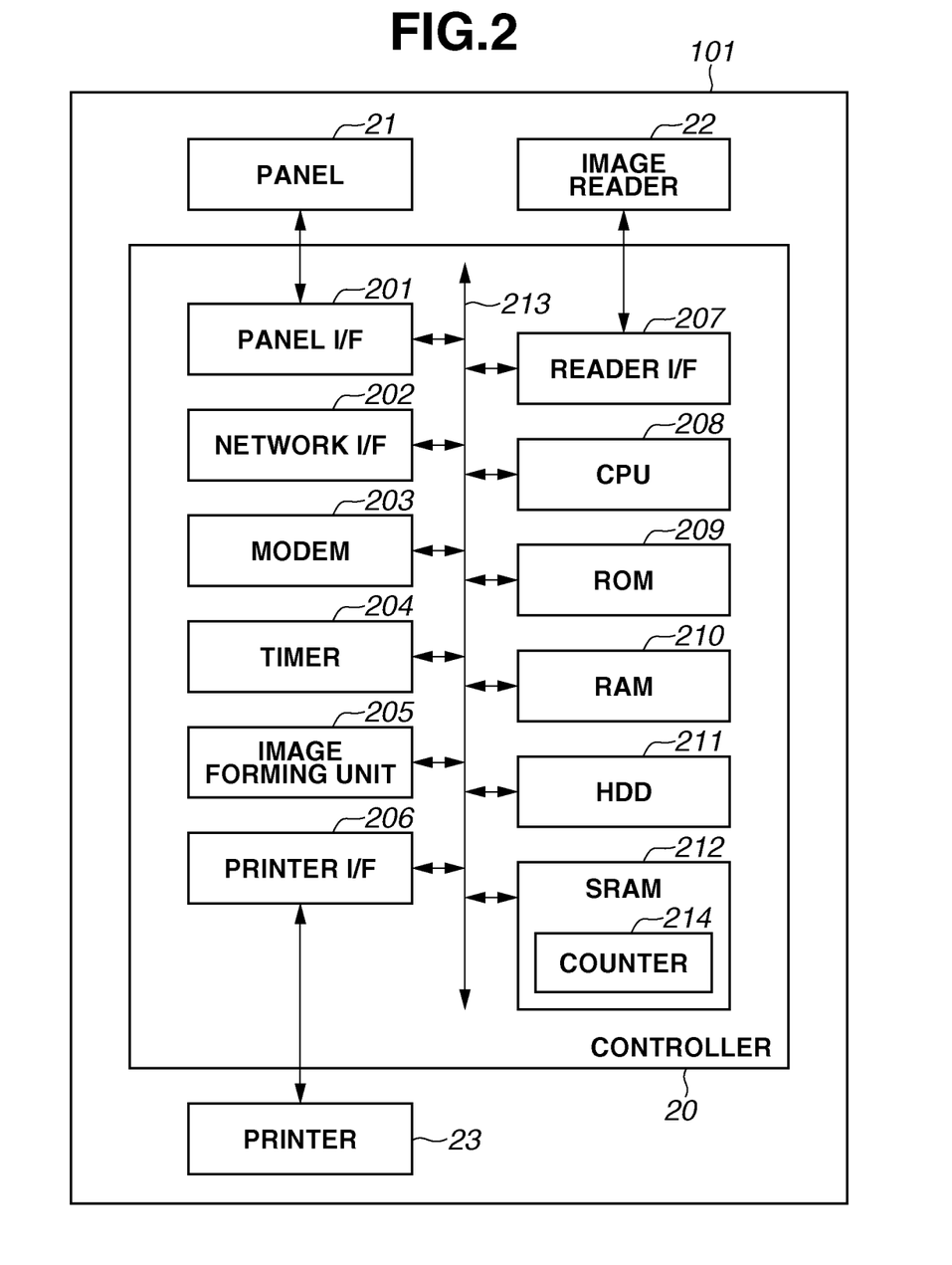
FIG. 2 is a block diagram illustrating a configuration of a multifunction peripheral.

FIG. 2 is a block diagram illustrating a configuration of the multifunction peripheral 101. The multifunction peripheral 101 includes a panel 21 for receiving an instruction from a user or a service engineer and displaying screen information, an image reader 22 for reading a document image, a printer 23 for printing an output image, and a controller 20.

The controller 20 includes a panel interface (I/F) 201, a network I/F 202, a modem 203, a timer 204, an image forming unit 205, a printer I/F 206, a reader I/F 207, a read only memory (ROM) 209, a random access memory (RAM) 210, a hard disk drive (HDD) 211, and a static random access memory (SRAM) 212 which are all connected to a central processing unit (CPU) bus 213 of a CPU 208.

The panel I/F 201 notifies the CPU 208 of instructions from a user and a service engineer, the instructions being input through the panel 21. Moreover, the panel I/F 201 outputs various screen information stored in the ROM 209, the RAM 210, and the HDD 211 to the panel 21.

The network I/F 202 is connected to a local area network (LAN) or the Internet via the network 108 to exchange information with an external network device. The modem 203 is connected to the telephone line 107 to transmit and receive facsimile data to and from an external facsimile apparatus. The timer 204 measures a predetermined time.

The image forming unit 205 generates an image based on a document read by the image reader 22 or print data received from an external unit.

The printer I/F 206 outputs the image generated by the image forming unit 205 to the printer 23 based on an instruction from the CPU 208.

The reader I/F 207 inputs the document image read by the image reader 22 based on an instruction from the CPU 208. The ROM 209 is a memory storing a control program and screen information to be displayed on the panel 21. The RAM 210 is a memory used as a work area of the CPU 208.

The HDD 211 is a readable-writable storage medium in which a computer readable program for each processing to be performed by the controller 20 is stored. The HDD 211 also stores image data, temporary data, and user data transmitted to the multifunction peripheral 101. The SRAM 212 is a non-volatile storage medium. The SRAM 212 stores various counter information 214 (e.g., information acquired by a charging counter and a charge-free counter) of the multifunction peripheral 101.

The CPU 208 is a processor for controlling each processing of the controller 20. The CPU 208 executes a control program stored in the HDD 211 and/or the ROM 209 to perform each step of a flowchart, which will be described below. Each step of the flowchart may be executed by other processors instead of the CPU 208 or a combination of such a processor and the CPU 208.

The multifunction peripheral 101 with such a configuration includes a charging management mechanism, which is briefly described. The multifunction peripheral 101 includes a charging counter. The charging counter counts the number of printed sheets to be charged every time the printer 23 prints an image input through the network 108, the telephone line 107, or the image reader 22. The external PC 102 can acquire information about the number of printed sheets counted by the charging counter, and a user of the multifunction peripheral 101 is charged afterward for the printing based on the information.

The multifunction peripheral 101 of the present exemplary embodiment has two operation modes. The first operation mode is used when a general user uses a copy function, a print function, a scanning function, and a facsimile function of the multifunction peripheral 101. This mode is hereinafter called a "normal mode". The second operation mode is a service engineer mode in which a service engineer uses the multifunction peripheral 101. The service engineer mode is divided into two operation modes of a "maintenance mode" and a "check-print mode". In the "maintenance mode", the service engineer performs maintenance work. For example, the maintenance work includes a check and a change of a parameter setting in a case where image disturbance or color misregistration occurs in the multifunction peripheral 101. The maintenance work also includes execution of an adjustment print job to print a test pattern for image adjustment. Moreover, the maintenance work includes a check on counter information used to count the number of printed sheets, and a check on a firmware version or a software version of the multifunction peripheral 101. The "check-print mode" is used when the service engineer uses a copy function of the multifunction peripheral 101. For example, this "check-print mode" is used when the service engineer adjusts color of an image and then makes a normal copy to check a print result. Any copy job executed during the maintenance mode is processed as a charge-free job.

Although the multifunction peripheral 101 operates in any of these operation modes, an operation screen displayed in each operation mode differs.

Figure 3A:
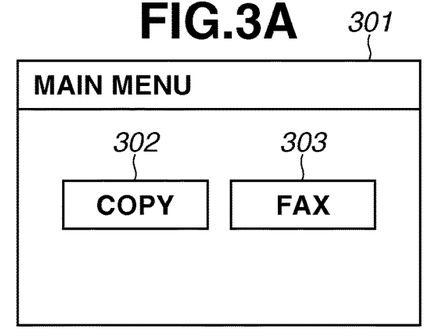
FIGS. 3A, 3B, 3C, 3D, 3E, and 3F are diagrams each illustrating an example of a screen displayed on a panel.
Figure 3B:
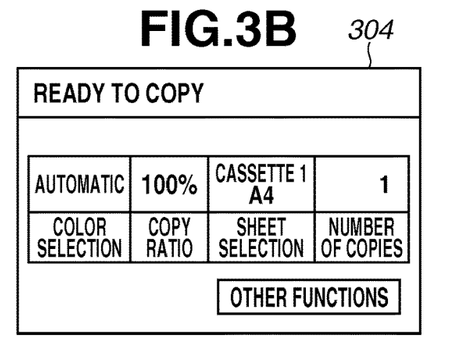
Figure 3C:
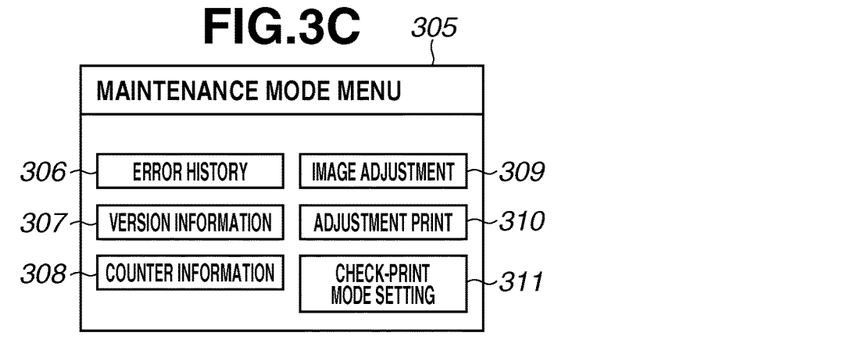
Figure 3D:
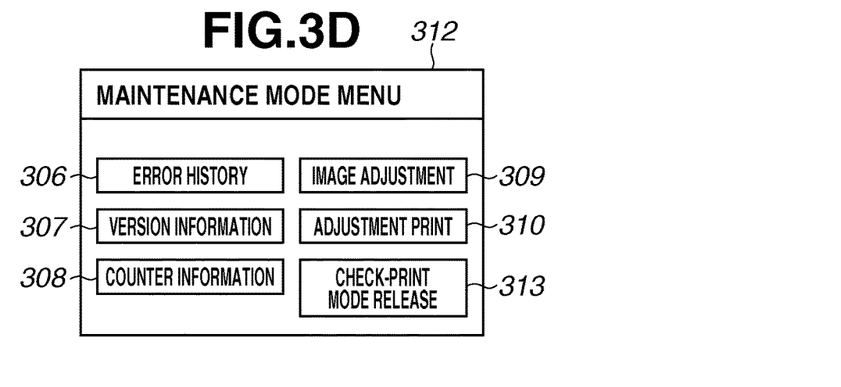
Figure 3E:
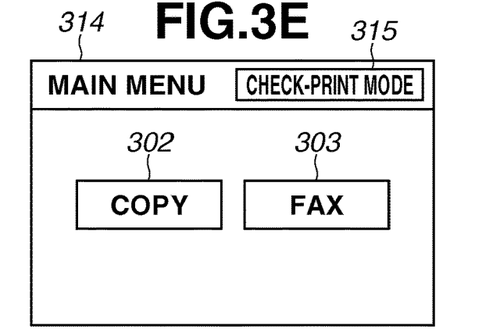
Figure 3F:
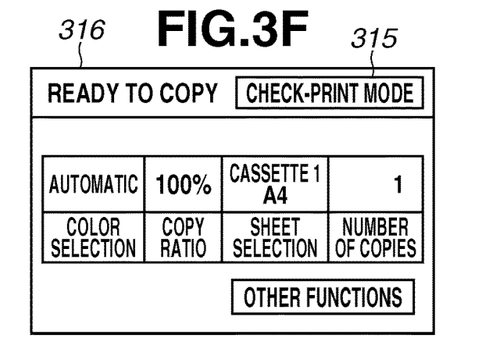

Each of FIGS. 3A through 3F is a diagram illustrating a screen example displayed on the panel 21 illustrated in FIG. 2. FIGS. 3A and 3B are diagrams illustrating operation screens displayed when the multifunction peripheral 101 is in the normal mode. FIGS. 3C and 3D are diagrams illustrating operation screens displayed when the multifunction peripheral 101 is in the maintenance mode. FIGS. 3E and 3F are diagrams illustrating operation screens displayed when the multifunction peripheral 101 is in the check-print mode.

FIG. 3A illustrates a main menu screen 301 displayed when the multifunction peripheral 101 is in the normal mode. When a button 302 and a button 303 on the main menu screen 301 are pressed, the operation screen shifts to a copy screen and a facsimile screen, respectively.

FIG. 3B illustrates a copy screen 304 displayed when the multifunction peripheral 101 is in the normal mode. A user instructs execution of copy processing from this screen 304.

FIGS. 3C and 3D illustrate maintenance mode menu screens 305 and 312, respectively. The multifunction peripheral 101 is shifted to the maintenance mode when the service engineer performs a special key operation through the panel 21. For example, when the service engineer inputs identification (ID) and a password through the panel or performs a special operation, the multifunction peripheral 101 is shifted to the maintenance mode. The special operation includes a long press of a key on the panel 21 or simultaneous presses of a plurality of keys on the panel 21. The service engineer performs the special key operation again when the multifunction peripheral 101 is released from the maintenance mode and shifted to the normal mode or the check-print mode. These operations are performed on the premise that they should be known only to the service engineer, and should not be disclosed to general users.

On the screens 305 and 312, the same reference numerals indicate items which do not undergo change in condition.

A button 306 is pressed to display history of critical errors which have occurred in the multifunction peripheral 101. A button 307 is pressed to display version information of each program for controlling the multifunction peripheral 101. A button 308 is pressed to display various counter information 214 including the number of sheets printed by the multifunction peripheral 101 and the number of sheets transmitted by the multifunction peripheral 101. A button 309 is pressed to check and change a parameter setting in a case where image disturbance or color misregistration occurs in the multifunction peripheral 101. A button 310 is pressed to print a test pattern for image adjustment of the multifunction peripheral 101.

A button 311 illustrated in FIG. 3C is pressed to switch the screens from the screen 305 illustrated in FIG. 3C to the screen 312 illustrated in FIG. 3D. A button 313 illustrated in FIG. 3D is pressed to switch the screens from the screen 312 illustrated in FIG. 3D to the screen 305 illustrated in FIG. 3C.

FIGS. 3E and 3F illustrate screen examples displayed when the multifunction peripheral 101 is in the check-print mode. The menus displayed on the screens 301 and 304 in the normal mode are similar to those displayed on a main menu screen 314 and a copy screen 316, respectively. However, unlike the screens 301 and 304, each of the screens 314 and 316 has a message 315 on an upper portion thereof. The message 315 notifies that the multifunction peripheral 101 is currently in the check-print mode.

Figure 4:
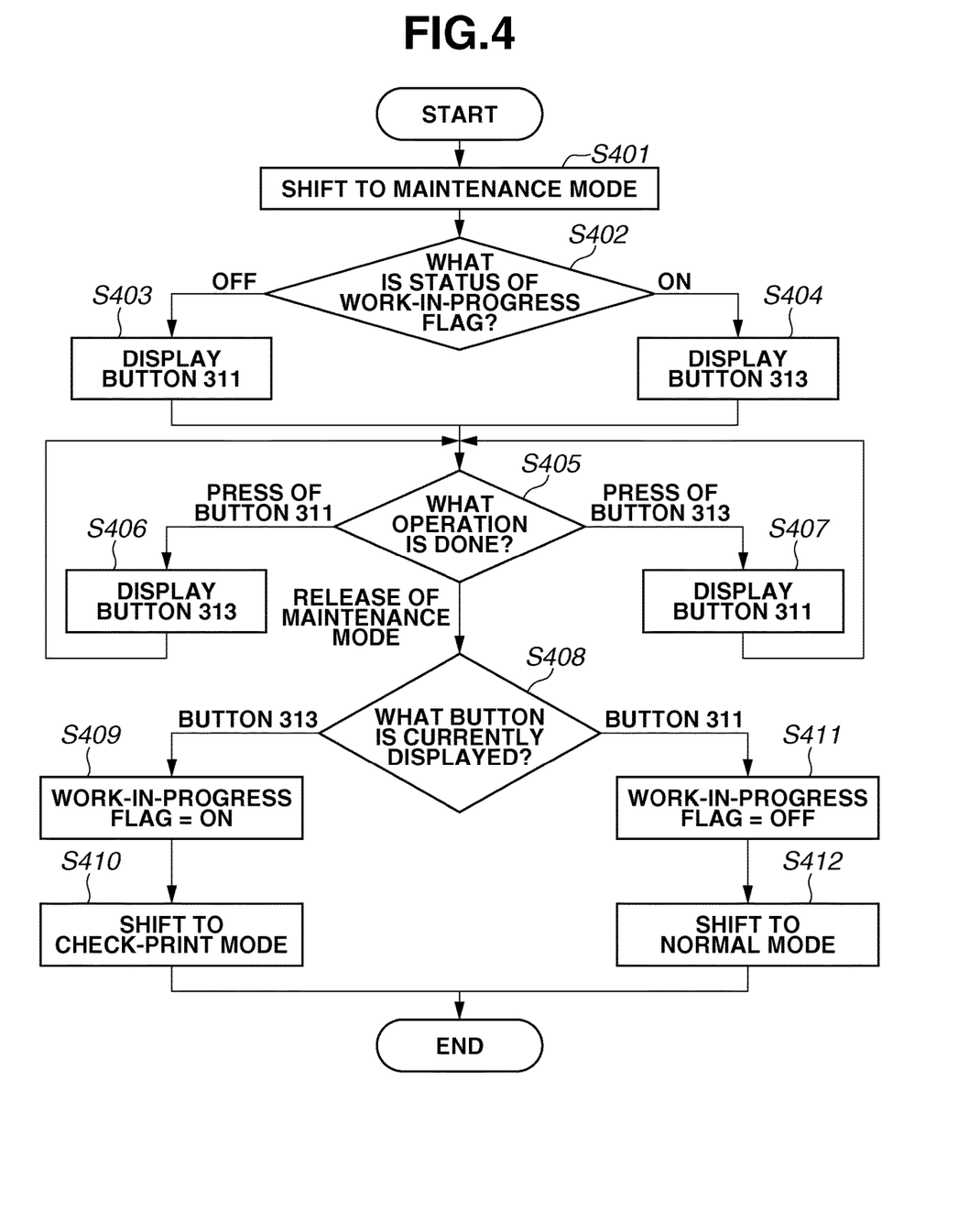
FIG. 4 is a flowchart illustrating processing executed when the multifunction peripheral is shifted to a maintenance mode.

FIG. 4 is a flowchart illustrating one example of processing performed by the multifunction peripheral 101. The processing illustrated in FIG. 4 starts when the multifunction peripheral 101 is shifted to the maintenance mode. Each of steps S401 through S412 is performed by loading the control program stored in the ROM 209 or the HDD 211 to the RAM 210 and executing the loaded program by the CPU 208 illustrated in FIG. 2.

In step S401, when the service engineer performs the special operation on the panel 21 of the multifunction peripheral 101, the CPU 208 shifts the multifunction peripheral 101 to the maintenance mode. Herein, the special operation is known only to the service engineer. The multifunction peripheral 101 is shifted to the maintenance mode when the service engineer operates a key (not illustrated) through the panel 21. Moreover, when the multifunction peripheral 101 is released from the maintenance mode, the service engineer operates the key (not illustrated) through the panel 21. The operation of the key enables the multifunction peripheral 101 to be shifted from the maintenance mode to the normal mode or the check-print mode. These operations are performed on the premise that they should be used only by the service engineer, and should not be disclosed to general users.

In step S402, the CPU 208 determines whether a "work-in-progress flag" stored in the RAM 210 is ON or OFF. The "work-in-progress flag" is a control flag (OFF/ON) used to determine whether the multifunction peripheral 101 should be shifted from the maintenance mode to the normal mode or the check-print mode. In the present exemplary embodiment, the service engineer may operate the special key when the multifunction peripheral 101 is in the maintenance mode, while the "work-in-progress flag" is OFF. In such a case, the multifunction peripheral 101 is shifted from the maintenance mode to the normal mode. On the other hand, the service engineer may operate the special key when the multifunction peripheral 101 is in the maintenance mode, while the "work-in-progress flag" is ON. In such a case, the multifunction peripheral 101 is shifted from the maintenance mode to the check-print mode. The control flag is initialized to OFF by the CPU 208 at the time of activation of the multifunction peripheral 101. When the multifunction peripheral 101 is first shifted to the maintenance mode after the activation, the "work-in-progress flag" is OFF. Accordingly, if the "work-in-progress flag" is OFF (OFF in step S402), the operation proceeds to step S403.

In step S403, the CPU 208 executes display processing for displaying the button 311 on the screen illustrated in FIG. 3C in the panel 21.

If the "work-in-progress flag" is ON (ON in step S402), then in step S404, the CPU 208 executes display processing for displaying the button 313 on the screen illustrated in FIG. 3D in the panel 21.

In step S405, the CPU 208 receives a button selection made by the service engineer through the menu screen displayed on the panel 21, and determines a content of the received selection. There are mainly three types of selection operations relevant to the present exemplary embodiment. The three operations include a press of the button 311 to set the check-print mode, a press of the button 313 to release the check-print mode, and an operation for releasing the multifunction peripheral 101 from the maintenance mode. Descriptions of other operations are omitted in this flowchart.

If the CPU 208 determines that the button 311 is pressed (PRESS OF BUTTON 311 in step S405), the operation proceeds to step S406. In step S406, the CPU 208 executes display processing for displaying the button 313 to be used to release the check-print mode. Herein, the button 311 is changed to the button 313. Then, the operation returns to step S405, so that the CPU 208 waits for a next operation.

On the other hand, if the CPU 208 determines that the button 313 is pressed (PRESS OF BUTTON 313 in step S405), the operation proceeds to step S407. In step S407, the CPU 208 executes display processing for displaying the button 311 used to set the check-print mode. Herein, the button 313 is changed to the button 311. Subsequently, the operation returns to step S405, so that the CPU 208 waits for a next operation.

If the CPU 208 determines that a predetermined operation for releasing the multifunction peripheral 101 from the maintenance mode is performed (RELEASE OF MAINTENANCE MODE in step S405), the operation proceeds to step S408. Herein, the CPU 208 makes a determination based on whether the service engineer has operated a key (not illustrated) through the panel 21. Alternatively, if a predetermined time period has elapsed without any operation of the service engineer, the operation may proceed to step S408.

In step S408, the CPU 208 determines whether either the button 313 illustrated in FIG. 3D or the button 311 illustrated in FIG. 3C is currently displayed on the panel 21.

If the CPU 208 determines that the button 313 is displayed (BUTTON 313 in step S408), then in step S409, the CPU 208 sets the "work-in-progress flag" stored in the RAM 210 to ON. Subsequently, in step S410, the CPU 208 shifts the multifunction peripheral 101 to the check-print mode.

On the other hand, if the CPU 208 determines that the button 311 is displayed (BUTTON 311 in step S408), then in step S411, the CPU 208 sets the "work-in-progress flag" stored in the RAM 210 to OFF. Subsequently, in step S412, the CPU 208 shifts the multifunction peripheral 101 to the normal mode.

Figure 5A:
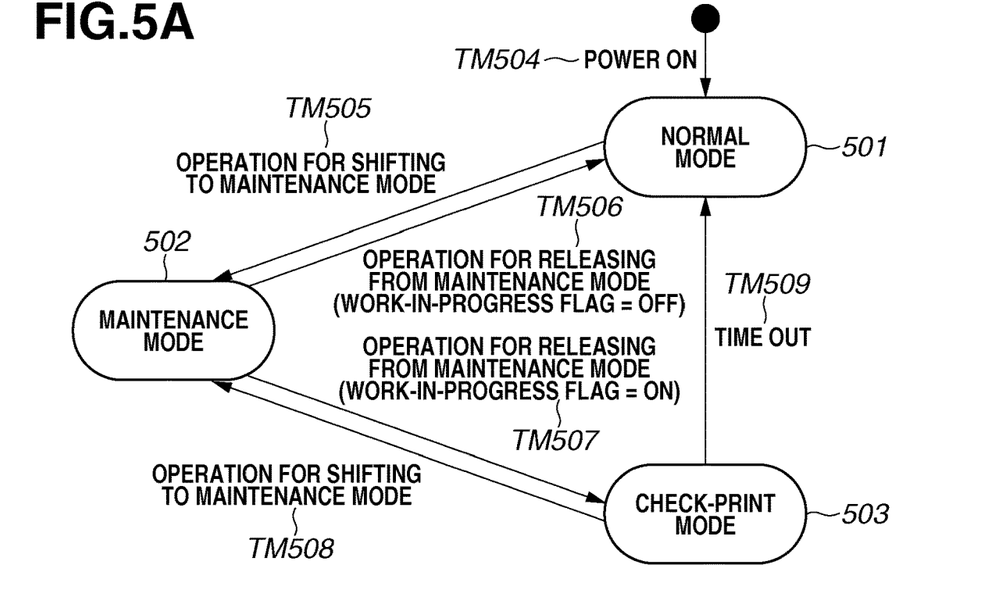
FIGS. 5A, 5B, and 5C are diagrams illustrating transition of operation modes of the multifunction peripheral.
Figure 5B:
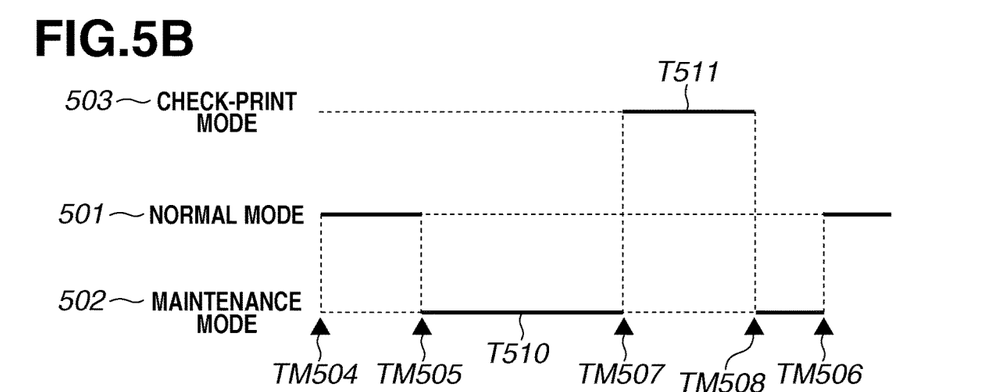
Figure 5C:
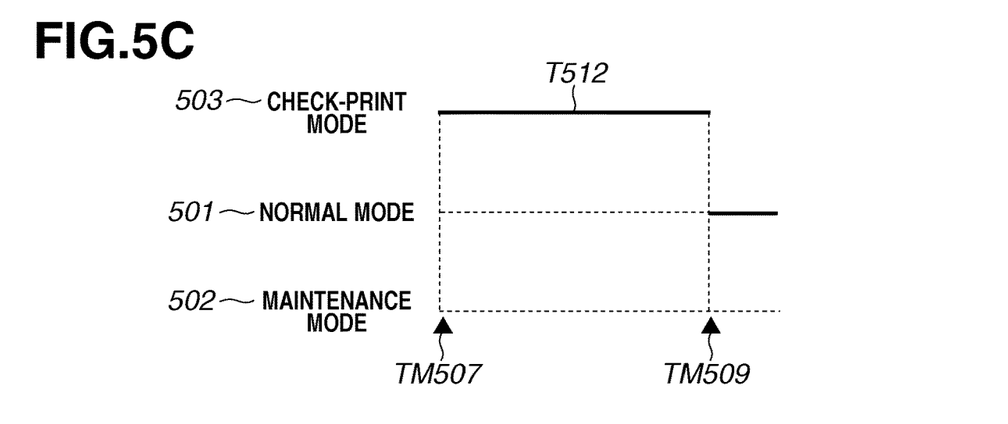

FIGS. 5A, 5B, and 5C are diagrams illustrating transition of the operation modes of the multifunction peripheral 101. FIG. 5A is a transition diagram illustrating each mode (the normal mode, the maintenance mode, and the check-print mode) of the multifunction peripheral 101. FIG. 5B is a timing chart illustrating an example of transition made when the service engineer performs maintenance work on the multifunction peripheral 101.

The multifunction peripheral 101 is activated in a normal mode 501 upon activation (TM504).

In the normal mode 501, if the service engineer performs an operation for shifting the operation mode of the multifunction peripheral 101 to the maintenance mode (TM505), the multifunction peripheral 101 is shifted to a maintenance mode 502. During a time period T510 in the maintenance mode 502, the service engineer performs various maintenance work on the multifunction peripheral 101 by operating the maintenance mode menu screens (the screens 305 and 312). The service engineer may execute a job such as copying as a part of the maintenance work. In such a case, the service engineer presses the button 311 (i.e., the "work-in-progress flag" is ON), and then performs an operation for releasing the multifunction peripheral 101 from the maintenance mode 502.

In the maintenance mode 502, the service engineer may perform an operation for releasing the multifunction peripheral 101 from the maintenance mode 502 while the check-print mode is set, that is, the "work-in-progress flag" is ON (TM507). In such a case, the multifunction peripheral 101 is shifted to a check-print mode 503.

During a time period T511 in the check-print mode 503, the service engineer executes a job such as copying as a part of the maintenance work. Moreover, when the service engineer finishes the work required for the check-print mode 503, the service engineer performs the operation for shifting the multifunction peripheral 101 to the maintenance mode 502 again to release the check-print mode 503.

In the check-print mode 503, if the service engineer performs an operation for shifting the operation mode of the multifunction peripheral 101 to the maintenance mode 502 (TM508), the multifunction peripheral 101 is shifted to the maintenance mode 502.

When finishing a series of the maintenance work, the service engineer presses the button 313 on the maintenance mode menu screen 312 (i.e., the "work-in-progress flag" is OFF), and then the multifunction peripheral 101 is released from the maintenance mode 502.

In the maintenance mode 502, when the service engineer performs the operation for releasing the multifunction peripheral 101 from the maintenance mode 502 while the "work-in-progress flag" is OFF (TM506), the multifunction peripheral 101 is shifted to the normal mode 501.

FIG. 5C is a timing chart illustrating an example case where the multifunction peripheral 101 is shifted from the check-print mode 503 to the normal mode 501 when time-out occurs after a predetermined time period elapses. As illustrated in FIG. 5C, the multifunction peripheral 101 is shifted to the check-print mode 503 (TM507). Subsequently, the timer 204 starts measuring time. When a predetermined time period T512 has elapsed, the multifunction peripheral 101 is automatically shifted to the normal mode 501 (TM509). This time-out can prevent a user from using the check-print mode by mistake in a case where the service engineer forgets to release the check-print mode 503.

Figure 6:
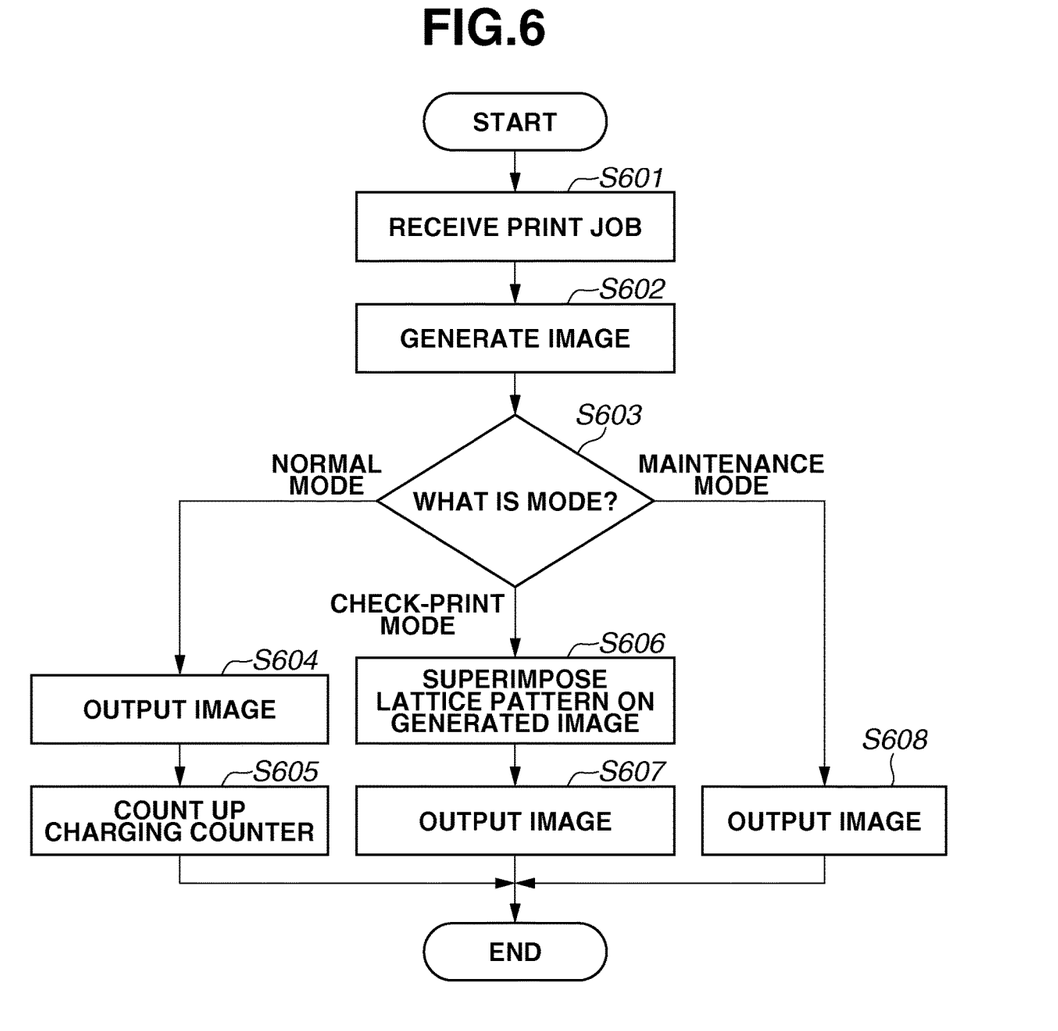
FIG. 6 is a flowchart illustrating processing performed in each operation mode of the multifunction peripheral.

FIG. 6 is a flowchart illustrating processing performed in each mode (the normal mode, the maintenance mode, and the check-print mode) of the multifunction peripheral 101. Each of steps S601 through S608 is performed by loading the control program stored in the ROM 209 or the HDD 211 to the RAM 210 and executing the loaded program by the CPU 208 illustrated in FIG. 2.

In step S601, the CPU 208 receives an instruction to execute a print job. Herein, the print job to be instructed and executed includes the following types. For example, the print job includes a job (a copy job) causing the printer 23 to print a document image read by the image reader 22, and a job (a BOX print job) causing the printer 23 to print image data accumulated in the HDD 211. The print job also includes a job (an adjustment print job) causing a test pattern for image adjustment to be printed according to an instruction from the service engineer (the adjustment print job can be instructed only when the multifunction peripheral 101 is in the maintenance mode). Moreover, the print job may be a job (a facsimile reception print job) causing facsimile data to be printed upon receipt of the facsimile data through the telephone line 107, or a print job (a page description language (PDL) print job) causing print data received from a PC through the network 108 to be printed.

Moreover, the instruction received in step S601 may be an instruction received based on an input from the user or the service engineer through the panel 21, or an instruction automatically received through the network 108 or the telephone line 107.

In step S602, the CPU 208 controls the image forming unit 205 to generate an image to be output to the printer 23 according to print setting received from the user or the service engineer or print setting included in a print job.

In step S603, the CPU 208 determines a mode of the multifunction peripheral 101. If the multifunction peripheral 101 is in the normal mode (NORMAL MODE in step S603), then in step S604, the CPU 208 outputs the image generated by the image forming unit 205 to the printer 23. In step S605, since a product printed in the normal mode is charge, the CPU 208 counts up a charging counter (updates a charging counter) of the counter information 214 stored in the SRAM 212. Then, a series of processing ends.

If the multifunction peripheral 101 is in the check-print mode (CHECK PRINT MODE in step S603), the operation proceeds to step S606. In step S606, the CPU 208 superimposes a lattice pattern image as illustrated in FIG. 7B on the image generated by the image forming unit 205. The CPU 208 outputs the image with the superimposed lattice pattern to the printer 23. Herein, the lattice pattern image is superimposed so that the CPU 208 distinguishes between a product printed in the check-print mode and a product printed in the normal mode. The product printed in the check-print mode is not charged, whereas the product printed in the normal mode is charged. The lattice pattern includes thin lines. A distance between the thin lines is arranged such that the service engineer can check whether there is image disturbance or color misregistration on an image printed on a sheet.

In the present exemplary embodiment, the lattice pattern is described as an example. However, other patterns may be applied as long as a product printed in the check-print mode and a product printed in the normal mode can be distinguished from each other. For example, an image or a character may be superimposed, so that a product printed in the check-print mode can be recognized. Moreover, in step S606, instead of superimposition of the lattice image, information in one portion of the generated image may be deleted, and the resultant image may be output. Alternatively, one portion of the generated image may be replaced with another image, and the resultant image may be output.

Figure 7A:
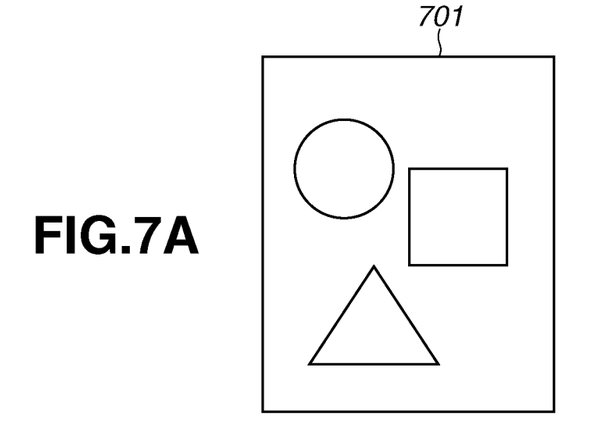
FIGS. 7A, 7B, and 7C are diagrams illustrating examples of output images.
Figure 7B:
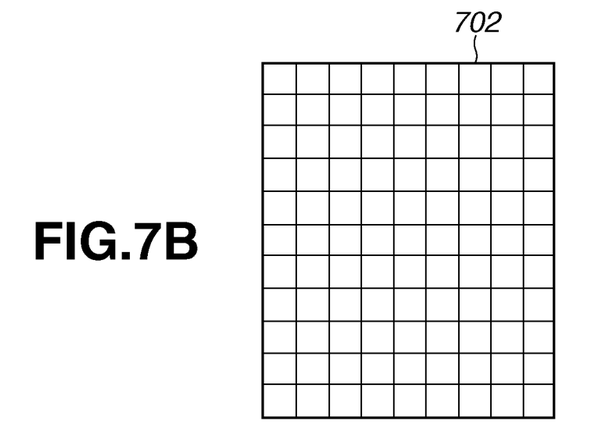
Figure 7C:
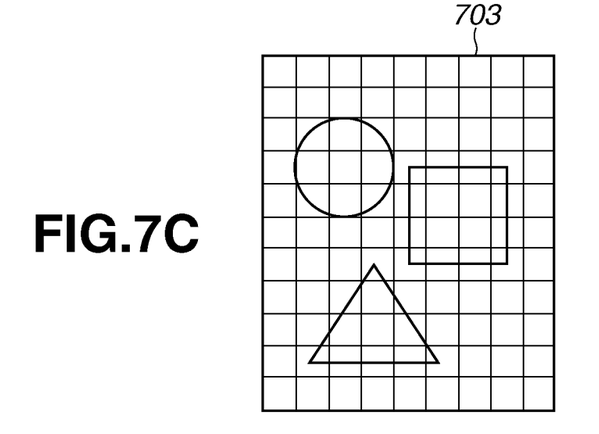

FIGS. 7A, 7B, and 7C are diagrams each illustrating an example of an image printed on a sheet. FIG. 7A illustrates an image example 701 output by the multifunction peripheral 101 in the normal mode. FIG. 7B illustrates a lattice pattern image example 702. FIG. 7C illustrates an image example 703 which is output after the lattice pattern is superimposed.

In the check-print mode, therefore, the CPU 208 superimposes the lattice pattern as a specific pattern on the image generated by the image forming unit 205 to acquire a printed product. Although such a printed product is good for maintenance, it is not good as a product desired by a user.

In step S607, the CPU 208 outputs the image with the superimposed lattice pattern to the printer 23, and the printer 23 prints such an image. Since the product printed in the check-print mode is charge-free, the CPU 208 does not count up the charging counter (does not update the charging counter). Then, a series of processing ends.

If the multifunction peripheral 101 is in the maintenance mode (MAINTENANCE MODE in step S603), the operation proceeds to step S608. In step S608, the CPU 208 outputs the image generated by the image forming unit 205 to the printer 23, and the printer 23 prints the image. In the present exemplary embodiment, in a case where the multifunction peripheral 101 is in the maintenance mode, the printer 23 prints a test pattern image for adjustment, the test pattern image being registered in the multifunction peripheral 101 beforehand. According to the present exemplary embodiment, the special operation for shifting the multifunction peripheral 101 to the maintenance mode might be leaked to the user. Even in such a case, as long as the multifunction peripheral 101 is in the check-print mode, the user cannot acquire a printed product similar to that acquired in the normal mode. Thus, it is possible to prevent the check-print mode from being unintentionally used by the user.

According to the present exemplary embodiment, when the multifunction peripheral 101 outputs an image in the check-print mode or the maintenance mode, a series of the processing ends without counting up the charging counter (without updating the charging counter). Thus, the general user is not charged for the printing performed by an instruction from the service engineer.

According to the present exemplary embodiment, the multifunction peripheral 101 is shifted from the check-print mode to the normal mode upon time-out. Consequently, even if the service engineer forgets to release the check-print mode, it is possible to prevent the check-print mode from being unintentionally used by the user. In the first exemplary embodiment, the multifunction peripheral 101 may receive a PDL print job and a facsimile reception print job while operating in the check-print mode. In such a case, the multifunction peripheral 101 can print an image without superimposing a lattice pattern.

In the first exemplary embodiment, when printing is performed in the check-print mode, the multifunction peripheral 101 uniformly superimposes a lattice pattern on a generated image, and prints the resultant image.

However, in a case where the multifunction peripheral 101 in the check-print mode does not restrict reception of a job from an external unit such as the network 108 and the telephone line 107, there is a possibility that a lattice pattern is unintentionally superimposed on a document which is not required for maintenance by the service engineer. For example, a lattice image is unintentionally superimposed when a facsimile reception document is printed.

In the first exemplary embodiment, when printing is performed in the check-print mode, the multifunction peripheral 101 does not count up the charging counter so that the printed product is charge-free. However, the multifunction peripheral 101 cannot determine how much printing has been performed for the charge-free products. Such problems are solved by a second exemplary embodiment which is described in detail below.

Unlike the multifunction peripheral of the first exemplary embodiment, a multifunction peripheral 101 of the second exemplary embodiment determines a job type when operating in a check-print mode. Moreover, the multifunction peripheral 101 of the second exemplary embodiment includes a charge-free counter in addition to a charging counter. The charge-free counter is provided as counter information of a SRAM 212 illustrated in FIG. 2.

Figure 8:
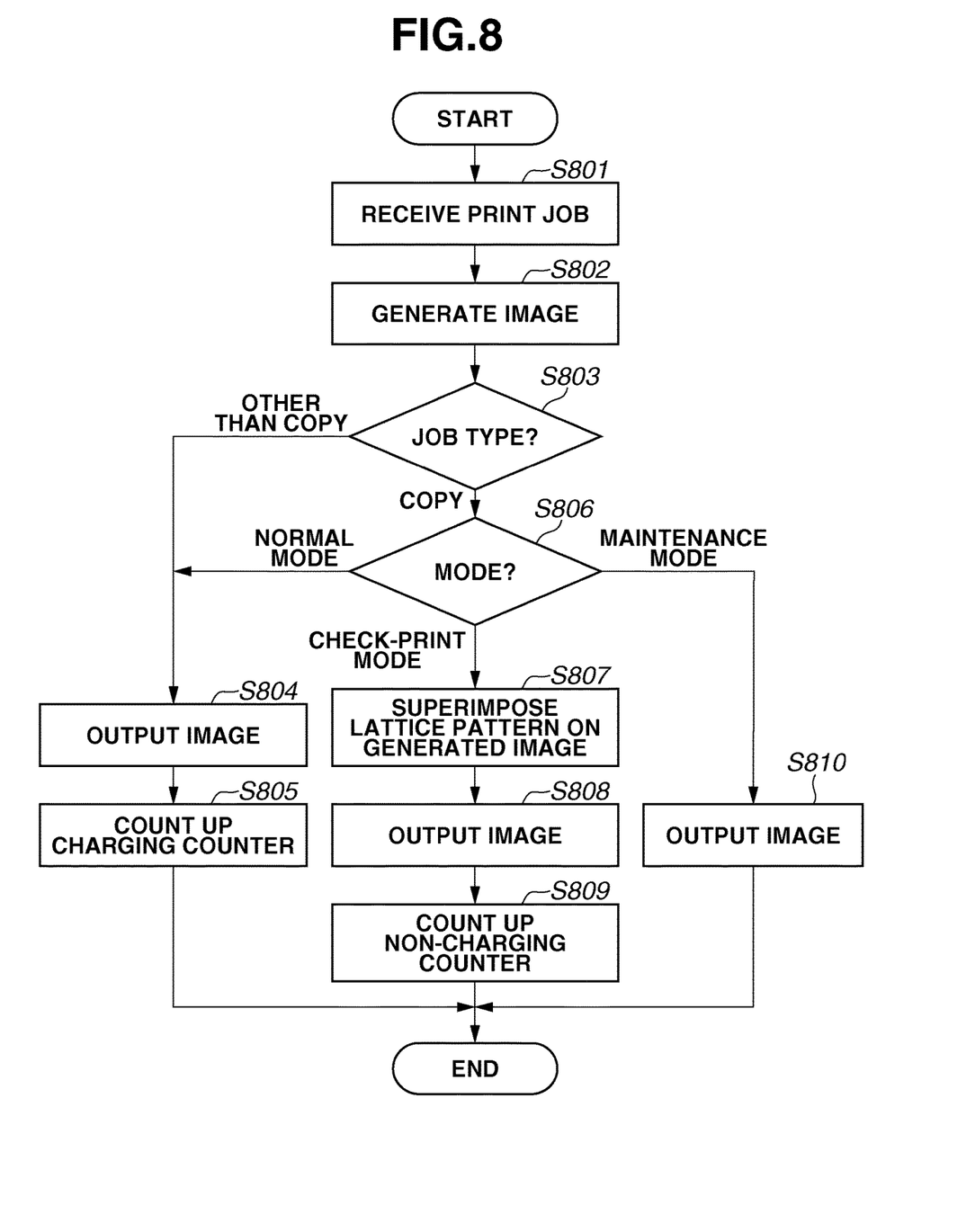
FIG. 8 is a flowchart illustrating processing performed in each operation mode of a multifunction peripheral according to a second exemplary embodiment.

FIG. 8 is a flowchart illustrating an example of processing performed by the multifunction peripheral 101 in each mode (a normal mode, a maintenance mode, and a check-print mode) according to the second exemplary embodiment. Each of steps S801 through S810 is performed by loading a control program stored in a ROM 209 or an HDD 211 to a RAM 210 and executing the loaded program by a CPU 208 illustrated in FIG. 2.

Processing in steps S801 and S802 illustrated in FIG. 8 is substantially the same as those in steps S601 and S602 illustrated in FIG. 6, respectively. Therefore, descriptions thereof are omitted.

In step S803, the CPU 208 determines a type of the job received in step S801. Herein, the CPU 208 determines whether the job received in step S801 is a copy job or other jobs (an adjustment print job, a PDL print job, a facsimile reception print job, and a BOX print job). If the CPU 208 determines that the received job is other than the copy job (OTHER THAN COPY in step S803), the operation proceeds to step S804. On the other hand, if the CPU 208 determines that the received job is the copy job (COPY in step S803), the operation proceeds to step S806.

In step S806, the CPU 208 determines an operation mode of the multifunction peripheral 101. If the CPU 208 determines that the multifunction peripheral 101 is in the check-print mode (CHECK-PRINT MODE in step S806), then in step S807, the CPU 208 superimposes a lattice pattern image on the image generated by an image forming unit 205. Subsequently, in step S808, the CPU 208 outputs the image with the superimposed lattice pattern to a printer 23. In a case where a copy job is instructed while the multifunction peripheral 101 is in the check-print mode, a printed product is charge-free. Thus, the charging counter is not counted up (charging processing is not performed). In step S809, the CPU 208 counts up the charge-free counter, which is provided in counter information 214 in addition to the charging counter. Then, a series of processing ends.

On the other hand, if the job type is determined as the copy job (COPY in step S803), and if the operation mode is determined as the normal mode (NORMAL MODE in step S806), the operation proceeds to step S804. In step S804, the CPU 208 outputs the image to the printer 23 without superimposing a specific pattern on an image, and the printer 23 prints the image. In step S805, the CPU 208 counts up the charging counter, and a series of the processing ends.

On the other hand, if the job type is determined as the copy job (COPY in step S803), and if the operation mode is determined as the maintenance mode (MAINTENANCE MODE in step S806), the operation proceeds to step S810. In step S810, the CPU 208 outputs the image generated by the image forming unit 205 to the printer 23, and the printer 23 prints the image. When the printing is performed by the multifunction peripheral 101 in the maintenance mode, the charging counter and the charge-free counter are not counted up. Then, a series of processing ends.

According to the second exemplary embodiment, the multifunction peripheral 101 as an image forming apparatus does not restrict reception of a specific job even in the check-print mode, and enables each of the service engineer and the user to work, thereby providing higher usability.

According to the second exemplary embodiment, moreover, the charge-free counter is provided in the multifunction peripheral 101. This not only makes the printing performed for maintenance by the service engineer charge-free, but also the multifunction peripheral 101 can determine how much printing has been performed for such maintenance. Therefore, the multifunction peripheral 101 as an image forming apparatus having good manageability can be provided.

In the first and second exemplary embodiments, the "normal mode", the "maintenance mode", and the "check-print mode" are switched according to an operation through the panel 21. In a third exemplary embodiment, on the other hand, in a case where print data is transmitted from each of PCs 102 through 104, any of a "normal mode", a "maintenance mode", and a "check-print mode" is designated on each PC side. A multifunction peripheral 101 switches the operation modes based on the designation provided on the PC side. The multifunction peripheral 101 with such a configuration is described.

In the third exemplary embodiment, first, a printer driver installed in each of the PCs 102 through 104 receives a print instruction for the multifunction peripheral 101 to print a document of a print target. Herein, a user or a service engineer designates any of the "normal mode", the "maintenance mode", and the "check-print mode" using a print setting screen of the printer driver. The printer driver generates PDL data from the document of the print target, and adds a command indicating the designated operation mode to the generated PDL data. Subsequently, the printer driver transmits the PDL data including the command to the multifunction peripheral 101.

Upon receipt of the print job in performing printing based on the PDL data (see, step S801 of FIG. 8), the multifunction peripheral 101 analyzes the received print job and, determines an operation mode thereof based on the analysis result (see, step S806).

According to the third exemplary embodiment, therefore, the operation mode of the multifunction peripheral 101 can be determined by designating the operation mode on the printer drive side of the PC.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printer comprising:
one or more processors; and
one or more memories including instructions that, when executed by the one or more processors, cause the printer to receive a print instruction of an image;
a print unit configured to print the image; and
a controller having the one or more processors which executes instructions stored in the one or more memories, the controller configured to,
set a mode that allows printing for free, wherein the mode gets released based on an elapse of a predetermined time so that the mode is not set;
based on a receipt of the print instruction while the mode has been set, control the print unit to print the image with a predetermined pattern without a charge of fee, and
based on a receipt of the print instruction while the mode has not been set, control the print unit to print the image with a charge of fee without printing the predetermined pattern.

2. The printer according to claim 1, wherein the mode gets released based on an elapse of a predetermined time since the mode has been set.

3. The printer according to claim 1, wherein the print instruction received while the mode has been set does not instruct printing of the predetermined pattern.

4. The printer according to claim 1, wherein the print instruction of an image is a copy instruction of a document, and the image is an image of the document obtained by scanning the document.

5. A printer comprising:
one or more processors; and
one or more memories including instructions that, when executed by the one or more processors, cause the printer to receive a print instruction of an image;
a print unit configured to print the image; and
a controller having the one or more processors which executes instructions stored in the one or more memories, the controller configured to,
set a mode that allows printing without increasing a charging counter, wherein the mode gets released based on an elapse of a predetermined time so that the mode is not set;
based on a receipt of the print instruction while the mode has been set, control the print unit to print the image with a predetermined pattern without increasing the charging counter, and
based on a receipt of the print instruction while the mode has not been set, control the print unit to print the image without printing the predetermined pattern and increase the charging counter.

6. The printer according to claim 5, wherein the mode is released based on an elapse of a predetermined time since the mode was set.

7. The printer according to claim 5, wherein the print instruction received while the mode has been set does not instruct printing of the predetermined pattern.

8. The printer according to claim 5, wherein the print instruction of an image is a copy instruction of a document, and the image is an image of the document obtained by scanning the document.

9. A printer comprising:
a user interface configured to receive a print instruction of an image;
a network interface configured to receive a print instruction of an image;

a print unit configured to print the image; and a controller having a processor which executes instructions stored in a memory, the controller configured to, set a mode that allows printing for free, wherein the mode gets released based on an elapse of a predetermined time so that the mode is not set;

based on a receipt of the print instruction while the mode has been set, control the print unit to print the image with a predetermined pattern without a charge of fee, in a case that the print instruction is received by the user interface, and control the print unit to print the image with a charge of fee without printing the predetermined pattern in a case that the print instruction is received by the network interface, and based on a receipt of the print instruction while the mode has not been set, control the print unit to print the image with a charge of fee without printing the predetermined pattern, regardless of whether the print instruction is received by the user interface or by the network interface.

10. The printer according to claim 9, wherein the mode is released based on an elapse of a predetermined time since the mode was set.

11. The printer according to claim 9, wherein the print instruction received while the mode has been set does not instruct printing of the predetermined pattern.

12. The printer according to claim 9, wherein the print instruction of an image is a copy instruction of a document, and the image is an image of the document obtained by scanning the document.

* * * * *